United States Patent Office 3,382,892
Patented May 14, 1968

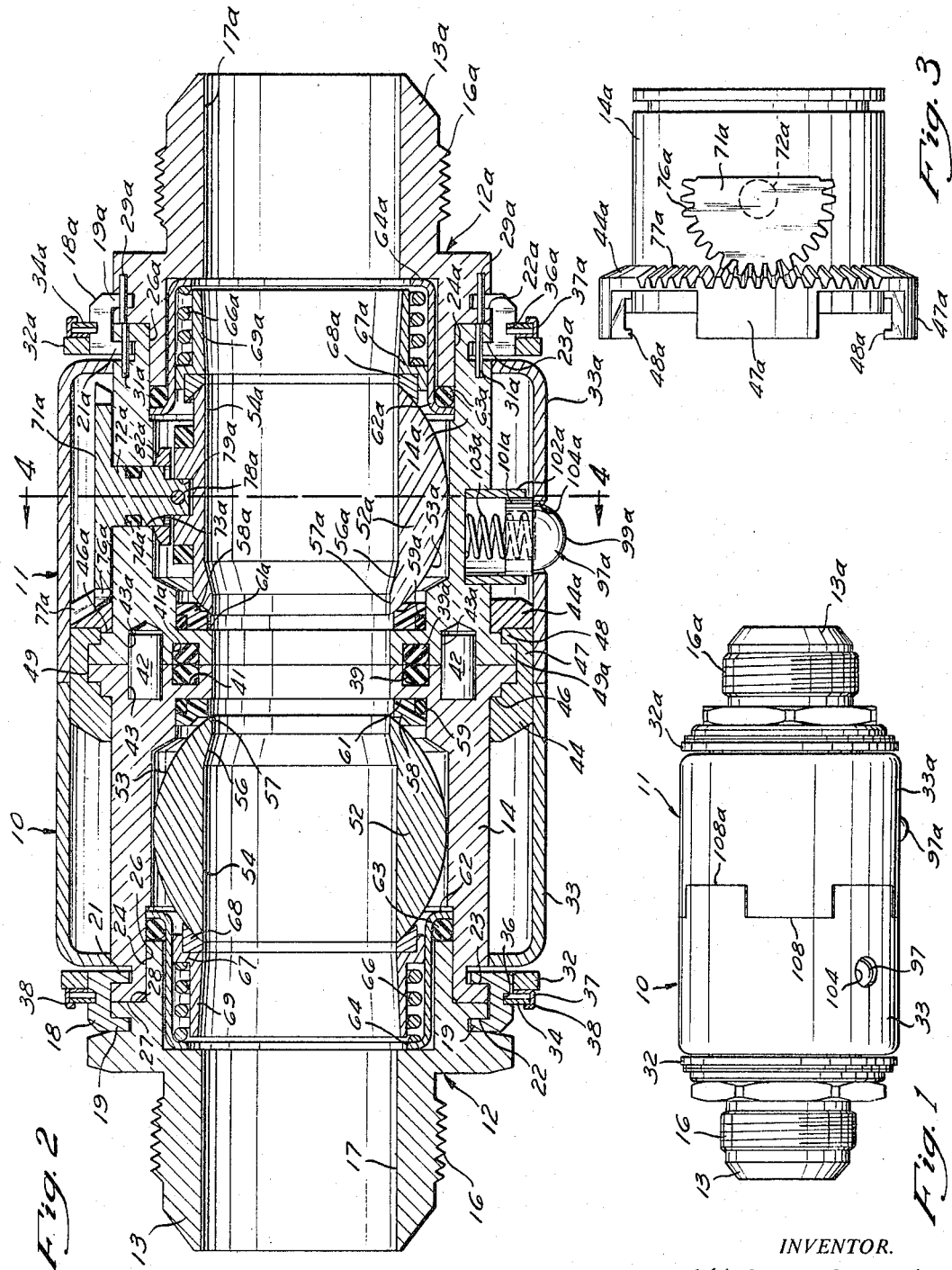

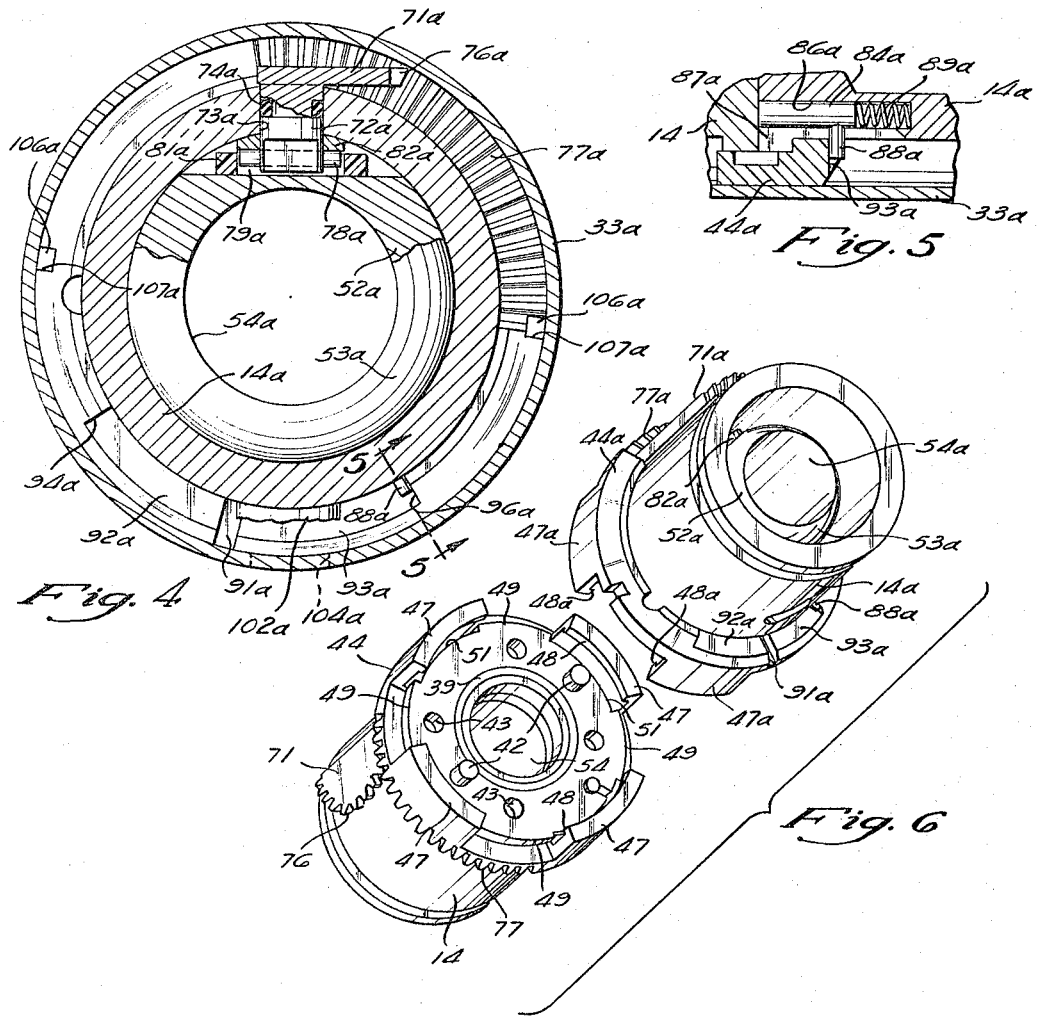

3,382,892
QUICK-DISCONNECT COUPLING
William G. Cerbin, Willowick, Ohio, assignor to The Weatherhead Company, Cleveland, Ohio, a corporation of Ohio
Filed Mar. 8, 1965, Ser. No. 437,800
11 Claims. (Cl. 137—614.02)

ABSTRACT OF THE DISCLOSURE

A quick-disconnect coupling including two identical coupling halves each provided with rotary valves operable to close the associated coupling half when the halves are disconnected. Each half including a lock ring which rotates with the ring of the other half in either direction from a released position to one of two coupled positions. When in either coupled position the ring cooperates to provide a locking structure completely encircling the coupling. The valves are closed by movement of the associated ring to the release position and are opened by rotation of the associated ring to either coupled position with the valves opening only after the rings connect the coupling halves. Each half is provided with two detents. One detent locks the valve closed when the coupling halves are separated and the second detent locks the rings in one coupled position. The second detent of one half locks both rings in one coupled position and the second detent of the other half locks both rings in the other coupled position, so only one detent need be released when the coupling is disconnected.

---

This invention relates generally to quick-disconnect couplings and more particularly to a novel and improved valved quick-disconnect coupling having identical coupling halves.

Quick-disconnect couplings are customarily used to detachably connect hoses and also detachably connect a hose and associated equipment. Prior quick-disconnect couplings have generally included a male coupling half and a mating female coupling half. When male and female coupling halves are used, a number of disadvantages result which are eliminated with a quick-disconnect coupling incorporating this invention. Such male and female coupling halves require the manufacture of more dissimilar parts causing increased tooling costs and greater inventory requirements. Further, the user must be sure that the hose or other devices to be connected by the male and female type quick-disconnect coupling are properly oriented with a male coupling half located adjacent to a female coupling half. In many instances it is necessary for the user to turn the hose end for end if it is initially laid out in the wrong direction.

A quick-disconnect having identical coupling halves incorporating this invention, hereinafter sometimes referred to as a neuter coupling, therefore has the advantages of reduced manufacturing cost, reduced inventory requirements and simplified use.

The illustrated embodiment of this invention not only provides identical coupling halves but also a flow through ball valve structure in each half which is automatically closed by the uncoupling movement and automatically opened by the coupling movement. The valve is arranged so that when it is open it provides substantially unrestricted flow with the type of turbulence normally occurring with poppet valve structures.

The mechanism for operating the valves and connecting the coupling half is arranged so that the coupling operation can be completed by rotation in either direction from the release position. A detent lock is provided on each coupling half with one detent lock operating in the event of coupling rotation in one direction and the other detent lock operating in the event of coupling rotation in the other direction. This insures that the user need only release a single detent lock when disconnecting the coupling halves. One or more lock pins are used to retain the coupling halves in their release position with the valve closed when disconnected and also to limit the rotation during coupling to the proper amount in either direction from the release position.

It is an important object of this invention to provide a novel and improved quick-disconnect coupling providing coupling halves wherein all of the parts of each coupling half are identical with corresponding parts of the mating coupling half.

It is another important object of this invention to provide a novel and improved quick-disconnect coupling having identical coupling halves wherein each coupling half includes a body assembly and a lock ring rotatable relative to the body assembly wherein the mechanical connection extends substantially completely around the periphery of the connected coupling for increased strength and rigidity.

It is another important object of this invention to provide a novel and improved quick-disconnect coupling according to either of the preceding objects wherein each coupling half includes a valve operated between the closed and open position by the coupling and uncoupling operation.

It is still another object of this invention to provide a novel and improved quick-disconnect coupling having identical coupling halves which are connected by rotation in either direction from the release position to one of two connected positions and are retained in the connected positions by a single retaining element so that the user need only release one retaining element in order to disconnect the coupling.

It is still another object of this invention to provide a novel and improved quick-disconnect coupling having identical coupling halves wherein a single lock pin holds the elements in the disconnect position when the coupling halves are separated and also limits the coupling movement to the proper amount during coupling movement in either direction from the release position.

It is another important object of this invention to provide a novel and improved quick-disconnect coupling having valved means operated by coupling and uncoupling movement wherein a mechanical connection is provided between the coupling halves before the valve opens.

Further objects and advantages will appear from the following description and drawings wherein:

FIGURE 1 is a side elevation of the preferred form of quick-disconnect coupling incorporating this invention illustrating the coupling in the connected position;

FIGURE 2 is a side elevation in longitudinal section of the quick-disconnected coupling in the coupled position;

FIGURE 3 is a fragmentary view with parts removed for purposes of illustration showing the gear drive for operating the valve;

FIGURE 4 is a cross-section taken along 4—4 of FIGURE 2 illustrating the structure of the valve and its drive;

FIGURE 5 is a fragmentary cross-section taken along 5—5 of FIGURE 4 illustrating the lock pin structure; and FIGURE 6 is a perspective exploded view with parts removed for purposes of illustration showing the alignment of the two coupling halves and illustrating the parts in the coupled position.

The quick-disconnect coupling includes two coupling halves 10 and 11 each of which is identical in structure. For purposes of simplification similar reference numerals will be used to designate similar parts in each of the coupling valves 10 and 11 with an "a" added to the reference numeral to indicate that it designates the part in the coupling half 11 and the numerals without the "a" to indicate that part in the coupling half 10 is referred to. Each coupling half includes a body assembly 12 consisting of an end fitting 13 and a tubular body member 14. The end fitting 13 is formed with external threads 16 adapted to receive the mounting part of a hose coupling and a through bore 17. The end fitting 13 and the body member 14 are connected by U-shaped ring halves 18 each of which extends around the coupling substantially 180°. The ring halves 18 are formed with spaced legs 19 and 21 proportioned to engage opposed faces 22 and 23 on the end fitting 13 and body 14, respectively. The end fitting 13 is formed with an external cylindrical surface 24 which closely fits an internal cylindrical surface 26 on the body member 14 for radial positioning of the two parts. Interengaging radial surfaces 27 and 28 are held in engagement by the lock ring half 18 and cooperate with the legs to axially fix the fitting 13 relative to the body member 14. A pair of pins 29a (appearing in the plane of the section of the coupling half 11) are mounted on opposite sides of each of the end fittings 13a and are proportioned to engage the ends of the lock ring halves and prevent relative rotation between the end fittings 13a and the lock ring halves 18a. Similar pins 31a are mounted on opposite sides of each of the body members 14a to engage the opposite ends of the lock ring halves 18a and prevent relative rotation between the halves 18a and the body member 14a. Therefore, the end fittings 13 and body member 14 of each coupling half is locked against relative rotation and held together by the lock ring halves 18. A solid ring 32 extends around the lock ring halves 18 and radially holds the lock ring halves in their mounted position. The ring 32 is retained in position on one side by a cover ring 33 and on the other side by a spiral spring 34 positioned in a groove 36. A lock ring 37 is positioned between the ring 32 and the spiral spring 34 and is provided with tabs 38 bent over the spiral spring to lock it in position.

Each of the body members 14 is provided with a face seal 39 positioned in an annular groove 41 and a pair of pins 42 which project into blind bores 43 in the associated body member 14 when the coupling is connected. These pins insure proper mating and prevent relative rotation between the two body members 14 and 14a.

A lock ring 44 is mounted on the forward end of the body member 14 and is positioned against a radial face 46. Each of the lock rings 44 and 44a is formed with axially extending sectors 47 best illustrated in FIGURES 3 and 6. In the illustrated embodiment the lock rings are formed with four symmetrically positioned sectors 47 each having a radial extent of about 45° and spaced from the adjacent sector by a space having a radial extent of about 45°. The ends of each of the sectors 47 are formed with an inturned flange 48 which fits over a mating radial flange 49 on the body member 14 or 14a of the associated coupling half when the coupling halves are connected. The flanges 49 are symmetrically arranged around the periphery of the forward end of the body members extending around the periphery about 45° and are spaced from the adjacent flanges by about 45°.

Intermediate the flanges 49 the spaces 51 have a radius proportioned to clear the inner surface of the inturned flanges 48 when the spaces 51 are aligned with the flanges 48 of the opposite coupling half. The flanges 49 have a radius adapted to fit within the inner surface of the projecting sectors 47 so that when the lock rings are rotated relative to the body to bring the flanges 48 of one coupling half into alignment with the flanges 49 of the other coupling half, the two coupling halves are locked together with their forward faces abutting and the seals 39 and 39a in sealing engagement. When the lock rings 44 and 44a are in the release position the flanges 48 of one coupling half are aligned with the spaces 51 of the other coupling half so that the lock rings clear the corresponding flanges and permit axial separation of the two coupling halves.

The ball valve member 52 is positioned within the body member 14 and is formed with a spherical external surface 53 and a bore 54 extending to a tapered section 56 and a slightly reduced diameter bore 57.

A seal member 58 engages the forward side of the ball valve and presses against a ring seal 59 engaging a radial wall 61 on the body member 14. When the bore 57 is aligned with the opening through the seal 58, as illustrated in FIGURE 2, through flow is provided. However, when the ball valve is rotated through 90° so that the seal 58 engages the imperforate spherical surface 53, flow through the coupling half is prevented.

A spring and seal retainer 62 presses a seal of the O-ring type 63 against the adjacent surfaces of the end fitting 13 and the body member 14 to prevent leakage out along the joint therebetween. The rearward end of the ring and seal retainer is provided with an inturned flange 64 engaging one end of a spring 66. The other end of the spring 66 engages a retainer 67 for a thrust member 68 which engages the rearward side of the ball valve 52 and resiliently maintains the ball valve against the seal 58. Thus the spring 66 performs a dual function of preloading the seal 63 and providing thrust for the thrust ring 68. The retainer 67 is provided with an axially extending tubular section 69 having an inner surface substantially aligned with the bore 17 in the end fitting and the bore 54 in the valve when the valve is open to reduce turbulence of the fluid flowing through the coupling.

The drive for rotating the ball valve is best illustrated in FIGURES 3 and 4. The drive includes a drive gear 71a having a stem 72a extending through and journaled in a lateral bore 73a in the body member 14a. A seal 74a prevents leakage along the stem 72a. The drive gear 71a is formed with gear teeth 76a which mesh with gear teeth 77a formed on the lock ring 44a so that relative rotation between the lock ring 44a and the body member 14a produces rotation of the drive gear 71a relative to the body member 14a. The gear teeth 76a extend around the drive gear 71a for slightly more than 180°, as best illustrated in FIGURE 3, so that rotation of the lock ring 44a in either direction from the release position illustrated in FIGURE 3 produces rotation of the drive gear 71a. The ratio of diameters is arranged so that as the lock ring 44a rotates relative to the body through substantially 45° the drive gear 71a rotates through substantially 90°.

A drive connection is provided between the drive gear 71a and the ball valve 52a. This drive includes a cross pin 78a mounted at the inner end of the stem 72a and positioned in a lateral groove 79a formed in the ball valve 52a. A retainer ring 81a fits around the pin and locks it in position. A thrust ring 82a is positioned between the pin 78a and the inner surface of the body member 14a to lock the drive gear 71a in position.

A lock pin 84a, best illustrated in FIGURE 5, is positioned in a bore 86a open to the face of the body member 14a and provided with a lateral opening 87a. A lateral projection 88a extends from the side of the pin 84a and through the lateral opening 87a. A spring 89a extends between the inner end of the bore 86a and the end of the pin 84a resiliently urging the pin forward relative to the coupling half. The rearward side of the lock ring 44a is formed with a radial notch 91a, best illustrated in FIGURES 4 and 6, and radial faces 92a and 93a extending in opposite directions from the notch 91a. The radial face 92a terminates at its outer end in an axially extending stop surface 94a and the radial surface 93a terminates in an axial surface 96a.

When the lock ring 44a is rotated relative to the body member 14a to the release position the notch 91a is in alignment with the projection 88a which is pushed into the notch by the spring 89a and serves to lock the lock ring against rotation relative to the body member when the coupling halves are disconnected. At this time the forward end of the lock pin 84a projects past the forward face of the body member 14a. When the associated coupling half is moved axially into position for coupling the end face of the body member 14 of the coupling 10 engages the end of the pin 84 and presses it back against the spring to lift the projection 88a out of the groove 91a. This permits rotation of the lock ring 44a in either direction from the release position through an angle of approximately 45° until the projection 88a engages one or the other of the axial extending stop surfaces 94a or 96a. When the projection 88a engages one of the stop surfaces 94a or 96a, the coupling is properly coupled and the flanges 49 of the coupling 10 are locked within the flanges 48a of the coupling half 11 and the flanges 49a of the coupling half 11 are locked within the flanges 48 of the coupling half 10. The pin 84a and its projection 88a therefor functions to hold the lock rings in the release position when the coupling is disconnected and also limits locking rotation of the lock rings during the coupling operation.

In order to lock the coupling in the coupled position a spring pressed detent is provided on each of the couplings. The detent of the coupling half 10 does not appear in the plane of FIGURE 2. The detent element 97a is formed with a spherical end 99a and a cylindrical section 101a is guided in a tube element 102a mounted in the body member 14a. A spring 103a resiliently urges the detent member 98a radially outward. The tubular cover 33a is provided with a radial bore 104a aligned with the detent member 97a when the lock ring 44a is rotated in a clockwise direction, as illustrated in FIGURE 4, until the projection 88a engages the surface 96a. When the bore 104a is in alignment with the detent 88a it snaps out to the lock position, illustrated in FIGURE 2, locking the tubular cover 33a against rotation relative to the body member 14a. Opposed drive lugs 106a fit in corresponding radial notches 107a in the lock ring 44a to prevent relative rotation between the tubular cover 33a and lock ring 44a. This structure is illustrated in FIGURE 4.

Since the cover elements 33 and 33a are locked against rotation relative to the associated lock rings 44 and 44a, rotation of the cover elements during the connection and disconnecting of the coupling causes the necessary rotation of the lock rings and the operation of the valves. Preferably, the cover elements 33 and 33a are formed with interlocking projections 108 and 108a proportioned so that the projections extend into the area of the spaces between the associated sectors 47 and 47a to protect the coupling against damage when the coupling halves are separated.

When the coupling halves 10 and 11 are separated the valves 52 and 52a are both closed and the lock pins 84 and 84a are in the forward position with the projections 88 and 88a in the associated groove 91 and 91a. When it is desired to couple the two coupling halves the halves are placed in a face to face relationship with the pins 42 of each coupling projecting into the aligned bores 43.

As illustrated in FIGURE 6, there are two pairs of opposed bores 43 either pair of which can receive the pins 42 of the associated coupling half. The pins 42 are displaced 45° from both pairs of bores 43 so when the sectors 47 and 47a are moved into the spaces of the associated coupling half the pins 42 are properly aligned with one or the other pairs of bores 43 of the associated coupling. The coupling can be connected in any one of four positions in the illustrated embodiment.

As the two body members 14 and 14a are moved into abutting relation the lock pins 84 and 84a are pressed back by the engagement of their ends with the forward face of the associated body member 14 or 14a. This causes the projections 88 and 88a to be lifted out of the notches 91 and 91a, respectively, so that the lock rings 44 and 44a are free to rotate. The user then merely rotates the cover members 33 and 33a in either direction until one or the other of the detents 98 or 98a snaps through the associated hole 104 or 104a. The intial rotation of the lock rings relative to the body members causes the flanges 48 and 48a to interlock with the flanges 49 and 49a before sufficient valve rotation has occurred to cause opening of the valves. Therefore, the coupling halves are mechanically locked together before either of the valves are opened and continued rotation of the covers and lock rings to the fully connected position causes the valve to rotate to the open position illustrated in FIGURE 2. The abutting relationship of the two seals 39 and 39a prevents leakage at the joint between the two coupling halves. Only one of the detent locks 98 or 98a operates with one operating upon rotation of the lock rings in one direction and the other upon rotation of the lock rings in the other direction. Therefore, to disconnect the coupling the user merely has to depress one of the detent elements and turn the covers 33 and 33a in the only direction the covers will rotate due to the engagement of the projections 88 and 88a with one or the other of the end surfaces 94, 94a or 96, 96a. Rotation of the lock rings back to the release position automatically operates to close the valves 52 and 52a before the lock rings release the mechanical connection between the coupling halves. As soon as the coupling halves are returned to their release position the mechanical connection between the lock rings and bodies is released and the coupling half can be separated. The separation of the two coupling halves allows the lock pins 84 and 84a to snap forward and lock the lock rings in the release position.

Since all of the parts in each of the coupling halves are identical the tooling and manufacturing costs are substantially lower than the corresponding costs for male and female type couplings. Also, the inventory costs are reduced. Finally, the use of the coupling incorporating this invention is considerably simplified since it is not necessary to insure that a particular end of the hose is located at a particular mating coupling.

Although a preferred embodiment of this invention is illustrated, it is to be understood that various modifications and rearrangements of parts may be resorted to without departing from the scope of the invention as defined in the following claims.

What is claimed is:

1. A coupling including two similar coupling halves, each coupling half comprising a body, a lock ring rotatable on said body in both directions from a release position to two lock positions, a valve in said body closed by movement of said lock ring to said release position and opened by rotation of said lock ring to either of said lock positions, said coupling half being proportioned to releasably connect with an identical coupling half, first detent means normally preventing rotation of said lock ring from said release position and releasing said lock ring for rotation when said coupling half is in abutting relationship with an identical coupling half, and second detent means on each coupling half, one being operable to releasably prevent rotation of said lock ring in only one of said lock positions and the second detent on the other coupling half being operable to releasably prevent rotation of said lock rings in the other of said lock positions.

2. A coupling including two substantially identical coupling halves, each half comprising a body having an end face adapted to abut and seal with the end face of the other coupling half, a lock ring rotatable on said body from a release position to a lock position, a valve in said body closed by movement of said lock ring to said release position and opened by rotation of said lock ring to said lock position, said coupling half being proportioned to releasably connect with the other coupling half, a spring pressed pin having an end projecting beyond said end face normally preventing rotation of said lock ring from said release position, said pin being pressed back flush with said end face when said coupling half is in abutting relationship with the other coupling half and releasing said lock ring for rotation, and fixed projections on said body projecting beyond said end face adapted to project into mating recesses in the end face of the other coupling half and lock the bodies against rotation.

3. A coupling half of a quick-disconnect coupling comprising a body having a radial end wall adapted to seal against an identical end wall of an identical coupling half, a lock ring rotatably mounted on said body in either direction from a release position, said lock ring being formed with peripherally spaced axially extending projections, peripherally spaced radially extending projections on said body having radially extending rearwardly facing surfaces spaced back from said end wall a predetermined distance, said axially extending projections having radially extending surfaces spaced forward from said end wall a distance substantially equal to said predetermined distance, said radially extending surfaces being adapted to mate with corresponding radially extending surfaces of an identical coupling half when said corresponding end walls engage and said lock ring is rotated relative to said body from said release position, and a valve in said coupling half closed by rotation of said lock ring to said release position and opened by rotation of said lock ring in either direction away from said release position.

4. A coupling including two mating coupling halves at least one of which has a structure as set forth in claim 3.

5. A coupling including two substantially identical coupling halves each having a structure as set forth in claim 3.

6. A coupling half of a quick-disconnect coupling comprising a body having a radial end wall adapted to seal against an identical end wall of an identical coupling half, a lock ring rotatably mounted on said body formed with peripherally spaced axially extending projections, peripherally spaced radially extending projections on said body having radially extending rearwardly facing surfaces spaced back from said end wall a predetermined distance, said axially extending projections having radially extending surfaces spaced forward from said end wall a distance substantially equal to said predetermined distance, said radially extending surfaces being adapted to mate with corresponding radially extending surfaces of an identical coupling half when said corresponding end walls engage and said lock ring is rotated relative to said body from a release position, and a valve in said coupling half closed by rotation of said lock ring to said release position and opened by rotation of said lock ring away from said release position, and means normally retaining said lock ring in said release position and automatically releasing said lock ring for rotation when said end wall engages the end wall of a corresponding coupling half.

7. A coupling including two mating coupling halves each coupling half comprising an elongated body assembly having a fluid flow passage therethrough, an end face on said body adapted to engage and seal with the end face of another identical coupling half, a plurality of circumferentially spaced radial projections on said body assembly, a lock ring rotatably mounted on said body assembly formed with circumferentially spaced axial projections, said lock ring being rotatable from a release position in either direction to lock positions, said axial projections of said lock ring being clear of said radial projections of an associated identical coupling half when said lock ring is in its release position and interlocking with such radial projections when said lock ring is in said lock positions, and valve means in said housing assembly operable by relative rotation between said housing assembly and lock ring closing said passage when said lock ring is in said release position and opening said passage in response to movement of said lock ring to said lock positions.

8. A coupling including two substantially identical coupling halves each coupling half comprising an elongated body assembly having a fluid flow passage therethrough, an end face on said body adapted to engage and seal with the end face of the other coupling half, a plurality of circumferentially spaced radial projections on said body assembly, a lock ring rotatably mounted on said body assembly formed with circumferentially spaced axial projections, said lock ring being rotatable from a release position in either direction to lock position, said axial projections of said lock ring being clear of said radial projections of an associated identical coupling half when said lock ring is in its release position and interlocking with such radial projections when said lock ring is in said lock positions, and valve means in said housing assembly operable by relative rotation between said housing assembly and lock ring closing said passage when said lock ring is in said release position and opening said passage in response to movement of said lock ring to said lock positions, a pin holding said lock ring in said release position when said coupling half is disconnected and permitting rotation of said clock ring when said end face abuts a corresponding end face the other half, said pin also limiting rotation of said lock ring to said lock positions.

9. A coupling half adapted to releasably connect with an identical coupling half comprising an elongated body having a fluid flow passage therethrough, an end seal on said body adapted to engage and seal with an identical seal on such identical coupling half, a lock ring on said body rotatable relative thereto about the central axis of said body in both directions from a release position, said lock ring being formed with symmetrical circumferentially spaced projections each having an inturned flange, the circumferential extent of said projections being substantially equal to the circumferential extent of the spaces therebetween, said body being formed with symmetrical circumferentially spaced laterally extending flanges having substantially the same circumferential spacing and the extent as said projections, said laterally extending flanges being proportioned to engage with the inturned flanges of such identical coupling half upon rotation of said ring relative to its associated body from said release position through an angle substantially equal to the circumferential extent of said flanges and projections whereby locking is provided around substantially the entire periphery of said coupling halves, and a valve in said coupling half closed by rotation of said lock ring to said release position and opened by rotation of said lock ring in either direction away from said release position.

10. A coupling including two substantially identical coupling halves each coupling half comprising an elongated body having a fluid flow passage therethrough, an end seal on said body adapted to engage and seal with an identical seal on the other coupling half, a lock ring on said body rotatable relative thereto about the central axis of said body, said lock ring being formed with symmetrical circumferentially spaced projections each having an inturned flange, the circumferential extent of said projections being substantially equal to the circumferential extent of the spaces therebetween, said body being formed with symmetrical circumferentially spaced laterally extending flanges having substantially the same circumferential spacing and the extent as said projections, lock means released by abutting contact with the other coupling half normally locking said lock ring in a release position with said lateral extending flanges radially within and aligned with said projections and inturned flanges, said laterally extending flanges being proportioned to engage with the inturned flanges of the other coupling half upon rotation of said ring relative to its associated body from said release position to a lock position through an angle substantially equal to the circumferential extent of said flanges and projections whereby locking is provided around substantially the entire periphery of said coupling halves, and a valve in said body closed by movement of said lock ring to said release position and opened by movement of said lock ring to said lock position.

11. A coupling including two substantially identical coupling halves each coupling half comprising an elongated body having a fluid flow passage therethrough, an end seal on said body adapted to engage and seal with the other seal on such identical coupling half, a lock ring on said body rotatable relative thereto about the central axis of said body, said lock ring being formed with symmetrical circumferentially spaced projections each having an inturned flange, the circumferential extent of said projections being substantially equal to the circumferential extent of the spaces therebetween, said body being formed with symmetrical circumferentially spaced laterally extending flanges having substantially the same circumferential spacing and the extent as said projections, lock means released by abutting contact with the other coupling half normally locking said lock ring in a release position with said lateral extending flanges radially within and aligned with said projections and inturned flanges, first interengaging means adapted to mate with the body of the other coupling half and prevent relative rotation between the bodies, second interengageable means adapted to mate with the lock ring of the other coupling and prevent relative rotation between the lock rings, said laterally extending flanges being proportioned to engage with the inturned flanges of the other coupling half upon rotation of said ring relative to its associated body from said release position through an angle substantially equal to the circumferential extent of said flanges and projections whereby locking is provided around substantially the entire periphery of said coupling halves.

References Cited
UNITED STATES PATENTS

| | | | |
|---|---|---|---|
| 2,819,914 | 1/1958 | Eitner | 137—614.04 |
| 2,948,553 | 8/1960 | Gill | 137—614.02 |
| 3,217,746 | 11/1965 | Volsine | 137—614.04 |

WILLIAM F. O'DEA, *Primary Examiner.*

H. M. COHN, *Assistant Examiner.*